United States Patent
Kim et al.

(10) Patent No.: US 11,569,520 B2
(45) Date of Patent: Jan. 31, 2023

(54) HEAT TREATMENT APPARATUS AND METHOD OF MEMBRANE ELECTRODE ASSEMBLIES

(71) Applicants: Hyundai Motor Company, Seoul (KR); Kia Motors Corporation, Seoul (KR)

(72) Inventors: Min Jin Kim, Seoul (KR); Sam Hee Yu, Gyeonggi-do (KR); Young June Park, Gyeonggi-do (KR); Woo Jin Lee, Seoul (KR); Ki Sub Lee, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 304 days.

(21) Appl. No.: 16/680,729

(22) Filed: Nov. 12, 2019

(65) Prior Publication Data

US 2020/0203743 A1 Jun. 25, 2020

(30) Foreign Application Priority Data

Dec. 24, 2018 (KR) .................. 10-2018-0168576

(51) Int. Cl.
*H01M 8/1004* (2016.01)
*H01M 8/04007* (2016.01)
*H01M 8/0267* (2016.01)

(52) U.S. Cl.
CPC ....... *H01M 8/1004* (2013.01); *H01M 8/0267* (2013.01); *H01M 8/04037* (2013.01)

(58) Field of Classification Search
CPC .......... H01M 8/0267; H01M 8/04037; H01M 8/1004; H01M 8/109; H01M 8/1093
See application file for complete search history.

(56) References Cited

U.S. PATENT DOCUMENTS

| | | | |
|---|---|---|---|
| 2008/0020254 A1* | 1/2008 | Mehmi | H01M 8/1067 429/492 |
| 2009/0174105 A1* | 7/2009 | Suzuki | B32B 38/08 264/104 |
| 2009/0239123 A1* | 9/2009 | Kotera | H01M 8/1053 264/104 |
| 2018/0331380 A1* | 11/2018 | Kim | H01M 8/1093 |

* cited by examiner

*Primary Examiner* — Brittany L Raymond
(74) *Attorney, Agent, or Firm* — Fox Rothschild LLP

(57) ABSTRACT

A heat treatment apparatus of membrane electrode assemblies includes a base, a first member extending from the base in a first direction, and a plurality of second members formed on the base in a radially outward direction of the first member and having inner surfaces facing the first member, where the first member or the second members includes a heat wire member, and membrane electrode assemblies are disposed between the first member and the second members.

6 Claims, 6 Drawing Sheets

HEAT TREATMENT APPARATUS AND METHOD OF MEMBRANE ELECTRODE ASSEMBLIES

CROSS-REFERENCE TO RELATED APPLICATION

This application claims under 35 U.S.C. § 119(a) the benefit of Korean Patent Application No. 10-2018-0168576 filed on Dec. 24, 2018, the entire contents of which are incorporated herein by reference.

BACKGROUND

(a) Technical Field

The present disclosure relates to a heat treatment apparatus of membrane electrode assemblies and a heat treatment method using the same.

(b) Description of the Related Art

A reaction that generates electricity in a fuel cell typically occurs in a membrane electrode assembly (MEA), which is a core part of the fuel cell.

In general, the membrane electrode assembly may have a three-layer structure including an ionomer-based electrolyte membrane and electrodes, i.e., a cathode formed on one surface of the electrolyte membrane, and an anode formed on the other (i.e., an opposite) surface of the electrolyte membrane.

Particularly, heat treatment may be carried out to manufacture unit cells including membrane electrode assemblies. Such heat treatment may reinforce interfacial adhesive forces between the electrodes and the electrolyte membrane of the membrane electrode assembly, thus enhancing durability and performance of the membrane electrode assembly.

Referring to FIG. 1 (RELATED ART), as one conventional heat treatment method of membrane electrode assemblies, a membrane electrode assembly 100 may be placed in a hot press 10, and then heat treatment through thermal conduction may be performed. Otherwise, referring to FIG. 2 (RELATED ART), membrane electrode assemblies 100 rolled into a roll may be placed in an oven, and then heat treatment using convection may be performed.

Such a membrane electrode assembly 100 may include, for example, an ionomer-based electrolyte membrane 105, a first electrode 110 (for example, a cathode) formed on one surface of the electrolyte membrane 105, and a second electrode 120 (for example, an anode) formed on the other surface of the electrolyte membrane 105.

However, the membrane electrode assembly 100 is sensitive to moisture and temperature and may thus easily contract and expand, and particularly if high-temperature heat treatment is performed, the membrane electrode assembly 100 may contract due to evaporation of moisture included in the electrolyte membrane 105 or deformation of a polymer, and irreversible structural deformation thereof may occur. For example, referring to FIG. 3 (RELATED ART), which is a cross-sectional view of the membrane electrode assemblies 100 rolled into the roll, taken along the line A-A of FIG. 2, the membrane electrode assemblies 100 rolled into the roll may have contraction weak parts B during heat treatment. Therefore, referring to FIG. 4 (RELATED ART), in order to prevent contraction and deformation of the membrane electrode assemblies 100 during heat treatment, sub-gaskets 50 may be adhered to the membrane electrode assemblies 100 (in the same manner, the sub-gaskets 50 depicted in FIG. 1 may be used when the hot press is used). Regarding the sub-gaskets 50, for example, a polymer film to which an adhesive is applied may be used. Such a polymer film may include one or more selected from the group consisting of: polyethylene naphthalate (PEN), polyethylene terephthalate (PET) and polyimide (PI). Further, the adhesive may include one or more selected from the group consisting of: polyvinyl acetate (PVA)-, urethane- and epoxy-based adhesives. Therefore, during heat treatment, the adhesive between the sub-gasket 50 and the membrane electrode assembly 100 may be exposed to excessive heat and thus degraded. Therefore, durability and quality defects of the membrane electrode assembly 100 (for example, separation of the sub-gasket 50 or deformation of the membrane electrode assembly 100 due to wetting of the adhesive) may be caused. Adhesion of the sub-gaskets 50 to the membrane electrode assembly 100 may reduce contraction and damage of the membrane electrode assembly 100 during heat treatment to some degree, but cannot effectively prevent the same.

If heat treatment is performed using the conventional hot press 10 (see FIG. 1), heat transfer efficiency may be high, and the hot press 10 holds the membrane electrode assembly 100 and may thus reduce contraction and deformation of the membrane electrode assembly 100, but membrane electrode assemblies 100 may only be heat-treated one at a time, and thus a production speed is low.

Meanwhile, if the membrane electrode assemblies 100 rolled into the roll (see FIG. 2) are placed in the oven and heat treatment using convection is performed, a large number of the membrane electrode assemblies 100 may be heat-treated at a time. However, if the membrane electrode assemblies 100 to which the sub-gaskets 50 are adhered are rolled into the roll and then heat-treated, as exemplarily shown in FIG. 4, an air layer 103 is formed in a region where no sub-gaskets 50 are provided, thus lowering heat transfer, and resulting in quality defects due to a temperature difference between a core part and an edge part of the roll of the membrane electrode assemblies 100.

Further, if no sub-gaskets 50 are adhered to the membrane electrode assemblies 100, as exemplarily shown in FIG. 3, the membrane electrode assemblies 100 rolled into the roll have parts which are subject to contraction (hereinafter referred to as "contraction weak parts B") due to thickness variations of respective layers during heat treatment, and thus serious deformation of the membrane electrode assemblies 100 is unavoidable. For example, the contraction weak parts B may include some parts of the electrolyte membrane 105 provided with no electrodes 110 and 120.

Therefore, it would be desirable to manufacture a high-quality membrane electrode assembly, which increases energy saving and production efficiency by performing heat treatment on a plurality of membrane electrode assemblies rolled into a roll, and has high performance and high durability through heat treatment without contraction or a temperature difference of the membrane electrode assembly.

SUMMARY

The present disclosure provides a heat treatment apparatus of membrane electrode assemblies and a heat treatment method using the same, which prevent membrane electrode assemblies from being structurally deformed or damaged by implementing separation between heat treatment of the membrane electrode assemblies and use of sub-gaskets.

It is another object of the present disclosure to enhance quality degradation and lowering of durability of membrane electrode assemblies due to degradation of an adhesive which may be generated during heat treatment after adhesion of sub-gaskets and the adhesive to the membrane electrode assemblies.

It is yet another object of the present disclosure to uniformly perform heat treatment of a plurality of membrane electrode assemblies without a temperature difference according to positions while causing no deformation.

In one aspect, the present disclosure provides a heat treatment apparatus of membrane electrode assemblies, including a base, a first member extending from the base in a first direction, and a plurality of second members formed on the base in a radially outward direction of the first member and including inner surfaces facing the first member, wherein at least the first member or the second members includes a heat wire member, and the membrane electrode assemblies are disposed between the first member and the second members.

In a preferred embodiment, the second members may be spaced apart from one another by a designated angle and configured to be moved in a radially inward direction toward the first member.

In another preferred embodiment, both ends of the second members in the first direction may include protrusions protruding in the radially inward direction.

In still another preferred embodiment, the protrusions of each of the second members may be formed in plural, a groove may be formed between the protrusions, and electrodes of the membrane electrode assemblies may be disposed in a region corresponding to the groove.

In yet another preferred embodiment, the protrusions may protrude from the second members to a length of 1 cm to 5 cm in the radially inward direction.

In still yet another preferred embodiment, the first member and the second members may be heated to a temperature range of 100° C. to 200° C.

In a further preferred embodiment, the second members may be moved in the radially inward direction toward the first member and pressurize the membrane electrode assemblies with a load of 500 kgf to 1000 kgf.

In another further preferred embodiment, the second members may include a load cell configured to measure a pressurized load applied to the membrane electrode assemblies.

In still another further preferred embodiment, the heat treatment apparatus may further include third members disposed on outer surfaces of the second members and fourth members installed so as to be stretchable from the base and contacting the third members, and, when the fourth members are stretched from the base in the first direction, the third members may pressurize the second members and the second members may be moved in the radially inward direction toward the first member.

In yet another further preferred embodiment, the fourth members may be stretchable in the first direction by a driver.

In still yet another further preferred embodiment, the first member may include stainless steel.

In a still further preferred embodiment, the membrane electrode assemblies may exclude sub-gaskets.

In a yet still further preferred embodiment, the membrane electrode assemblies may be stacked in plural and disposed between the first member and the second members, and interleaving sheets may be formed between the membrane electrode assemblies.

In another preferred embodiment, the interleaving sheets may include one or more selected from the group consisting of aluminum (Al) and copper (Cu).

In still another preferred embodiment, the interleaving sheets may have a thickness of 50 μm to 100 μm.

In another aspect, the present disclosure provides a heat treatment method of membrane electrode membranes, including disposing the membrane electrode assemblies provided in plural between the first member and the second members of the above-described heat treatment apparatus, pressurizing the membrane electrode assemblies by moving the second members in the radially inward direction toward the first member, and conducting heat to the membrane electrode assemblies by heating at least the first member or the second members.

In a preferred embodiment, the disposing the membrane electrode assemblies between the first member and the second members may include winding the membrane electrode assemblies on the first member so as to be stacked on the first member in the radially outward direction.

In another preferred embodiment, the heat treatment may further include forming the membrane electrode assemblies, each membrane electrode assembly including a first electrode, a second electrode and an electrolyte membrane formed between the first electrode and the second electrode, prior to the disposing the membrane electrode assemblies between the first member and the second members.

In still another preferred embodiment, the heat treatment method may further include forming interleaving sheets between the membrane electrode assemblies, prior to the disposing the membrane electrode assemblies between the first member and the second members.

In yet another preferred embodiment, in the pressurizing the membrane electrode assemblies, the second members may be moved in the radially inward direction toward the first member to pressurize the membrane electrode assemblies with a load of 500 kgf to 1000 kgf.

In still yet another preferred embodiment, in the pressurizing the membrane electrode assemblies, when a pressurized load applied to the membrane electrode assemblies is less than 500 kgf, the second members may be moved in the radially inward direction toward the first member and, when the pressurized load applied to the membrane electrode assemblies exceeds 1000 kgf, the second members may be moved in the radially outward direction. In a further preferred embodiment, in the conducting heat to the membrane electrode assemblies, the heat may be conducted to the membrane electrode assemblies by heating at least the first member or the second members to a temperature range of 100° C. to 200° C.

Other aspects and preferred embodiments of the disclosure are discussed infra.

The above and other features of the disclosure are discussed infra.

BRIEF DESCRIPTION OF THE DRAWINGS

The above and other features of the present disclosure will now be described in detail with reference to certain exemplary embodiments thereof illustrated in the accompanying drawings which are given hereinbelow by way of illustration only, and thus are not limitative of the present disclosure, and wherein.

Figure 1:
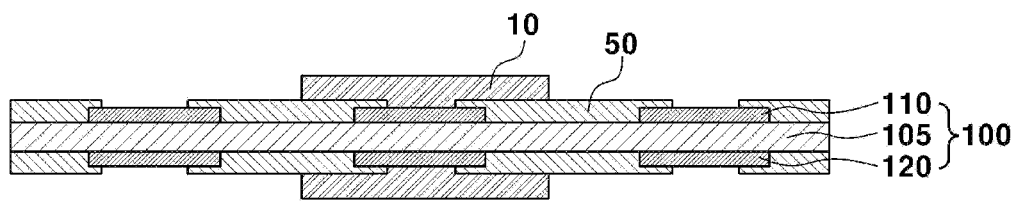
FIG. 1 (RELATED ART) is a cross-sectional view illustrating a membrane electrode assembly which is heat-treated using a conventional hot press.
Figure 2:
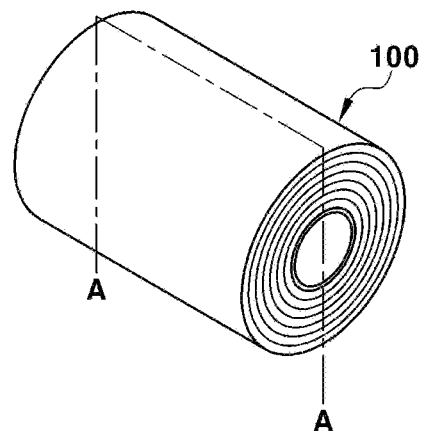
FIG. 2 (RELATED ART) is a conceptual view illustrating membrane electrode assemblies rolled into a roll.
Figure 3:
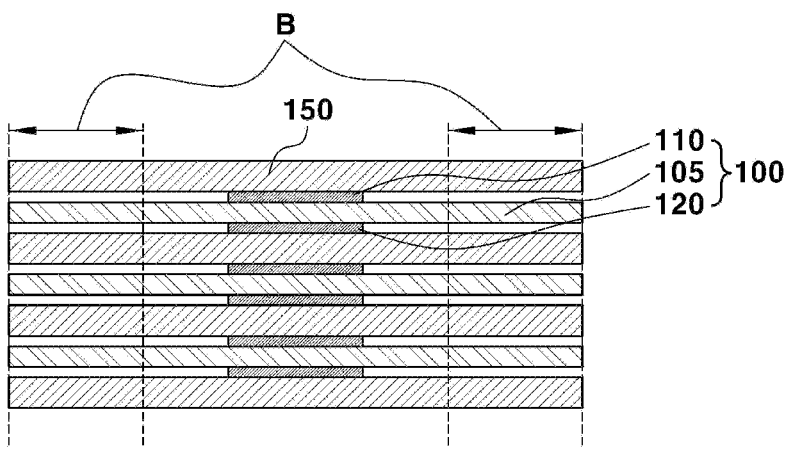
FIG. 3 (RELATED ART) is a partial cross-sectional view of FIG. 2, taken along line A-A.
Figure 4:
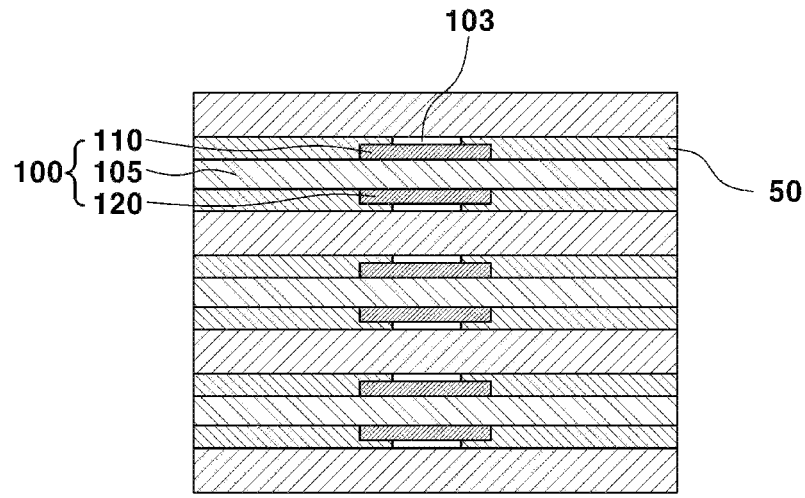
FIG. 4 (RELATED ART) is a cross-sectional view illustrating membrane electrode assemblies to which sub-gaskets are applied according to a conventional heat treatment method.

It should be understood that the appended drawings are not necessarily to scale, presenting a somewhat simplified representation of various preferred features illustrative of the basic principles of the disclosure. The specific design features of the present disclosure as disclosed herein, including, for example, specific dimensions, orientations, locations, and shapes will be determined in part by the particular intended application and use environment.

In the figures, reference numbers refer to the same or equivalent parts of the present disclosure throughout the several figures of the drawing.

DETAILED DESCRIPTION

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter reference will be made in detail to various embodiments of the present disclosure, examples of which are illustrated in the accompanying drawings and described below. While the disclosure will be described in conjunction with exemplary embodiments, it will be understood that the present description is not intended to limit the disclosure to the exemplary embodiments. On the contrary, the disclosure is intended to cover not only the exemplary embodiments, but also various alternatives, modifications, equivalents and other embodiments within the spirit and scope of the disclosure as defined by the appended claims. In the following description of the embodiments, the same elements are denoted by the same reference numerals even though they are depicted in different drawings.

Hereinafter, the present disclosure will be described in detail with reference to the accompanying drawings.

Figure 5:
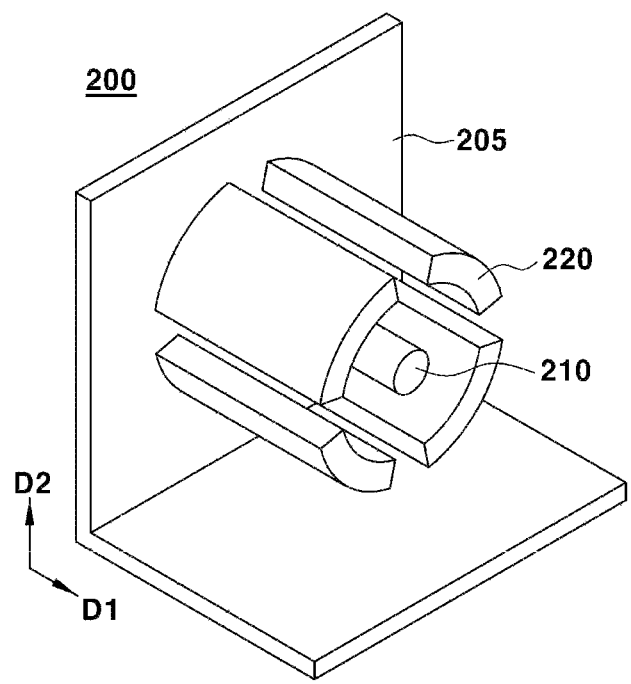
FIGS. 5 and 6 are conceptual views illustrating a heat treatment apparatus in accordance with one embodiment of the present disclosure.
Figure 6:
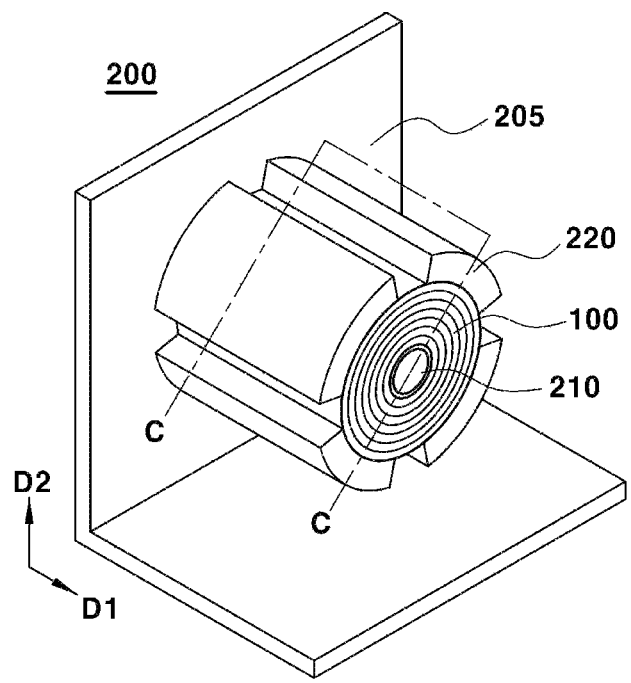

FIGS. 5 and 6 are conceptual views illustrating a heat treatment apparatus in accordance with one embodiment of the present disclosure.

First, referring to FIG. 5, a heat treatment apparatus 200 to heat-treat the membrane electrode assemblies 100 in accordance with one embodiment of the present disclosure may include a base 205, a first member 210 extending from the base 205 in a first direction D1, and a plurality of second members 220 formed on the base 205 in a radially outward direction of the first member 210 and having inner surfaces facing the first member 210. Although FIG. 5 illustrates that the base 205 extends in the first direction D1, the base 205 is not limited thereto. The base 205 may be installed in various directions in which the heat treatment apparatus 200 is desired to be installed (for example, in a second direction D2).

Further, the second members 220 may be spaced apart from one another by a designated angle, as exemplarily shown in FIG. 5. Further, the second members 220 may be configured to be moved in a radially inward direction toward the first member 210. Therefore, when the membrane electrode assemblies 100 are disposed between the first member 210 and the second members 220, the second members 220 are moved in the radially inward direction toward the first member 210 and may thus pressurize the disposed membrane electrode assemblies 100.

Although FIG. 5 illustrates four second members 220, the number of the second members 220 is not limited thereto. A plurality of second members 220 (for example, two, three, five or more second members 220) may be formed such that the inner surfaces (i.e., the inner circumferential surfaces) of the second members 220 may face the outer surface (i.e., the outer circumferential surface) of the first member 210. Further, the inner surfaces of the second members 220 may have various curvatures.

At least the first member 210 or the second members 220 may include a heat wire member. That is, one of the first member 210 and the second members 220 may include a heat wire member, or both the first member 210 and the second members 220 may include a heat wire member. Such a heat wire member may heat the first member 210 and/or the second members 220. Thereby, heat may be conducted and transferred to an object disposed between the first member 210 and the second members 220.

The first member 210 or the second members 220 may be heated to a temperature range of, for example, 100° C. to 200° C. Therefore, the membrane electrode assemblies 100 disposed between the first member 210 and the second members 220 may be heat-treated to the temperature range of 100° C. to 200° C. by thermal conduction.

Therefore, a heat treatment method of the membrane electrode assemblies 100 using the heat treatment apparatus 200 in accordance with one embodiment of the present disclosure may include disposing a plurality of the membrane electrode assemblies 100 between the first member 210 and the second members 220 of the heat treatment apparatus 200, pressurizing the membrane electrode assemblies 100 by moving the second members 220 in the radially inward direction toward the first member 210, and conducting heat to the membrane electrode assemblies 100 by heating at least the first member 210 and/or the second members 220.

Next, FIG. 6 illustrates disposition of the membrane electrode assemblies 100 between the first member 210 and the second members 220 of the heat treatment apparatus 200 in accordance with one embodiment of the present disclosure. The membrane electrode assemblies 100 are wound on the first member 210 to be rolled into a roll, thus being disposed between the first member 210 and the second members 220. That is, the membrane electrode assemblies 100 may be disposed along the outer circumferential surface of the first member 210 and the inner circumferential surfaces of the second members 220. Thereby, if the first member 210 and the second members 220 are heated, heat may be conducted and transferred to the membrane electrode assemblies 100 disposed between the first member 210 and the second members 220. Accordingly, the membrane electrode assemblies 100 may be uniformly heat-treated without a temperature difference according to positions.

In the heat treatment apparatus 200 in accordance with one embodiment of the present disclosure, the first member 210 may include stainless steel (i.e., an SUS material). Therefore, the first member 210 may support the weight of the membrane electrode assemblies 100 rolled into the roll, wound thereon and easily conduct heat to the membrane electrode assemblies 100. Further, the diameter of the first member 210 may be varied according to the membrane electrode assemblies 100 rolled into the roll.

As the membrane electrode assemblies 100 are disposed between the first member 210 and the second members 220, and the second members 220 may be moved in the radially inward direction toward the first member 210. Here, the second members 220 may pressurize the membrane electrode assemblies 100 with a load of 500 kgf to 1000 kgf. For example, in pressurization of the membrane electrode assemblies 100, when a pressurized load applied to the membrane electrode assemblies 100 is less than 500 kgf, the second members 220 may be moved in the radially inward direction toward the first member 210. In contrast, when the pressurized load applied to the membrane electrode assemblies 100 exceeds 1000 kgf, the second members 220 may be moved in the radially outward direction. That is, the second members 200 become far away from the first member 210 and may thus reduce the pressurized load applied to the first member 210.

Further, in order to measure (or control) the pressurized load applied to the membrane electrode assemblies 100, the second members 220 may include, for example, a load cell. In addition to the load cell, various members to measure or control movement of the second members 220 and the pressurized load applied to the disposed membrane electrode assemblies 100 may be included in the second members 200 or be provided at the outside of the second members 200.

Figure 7:
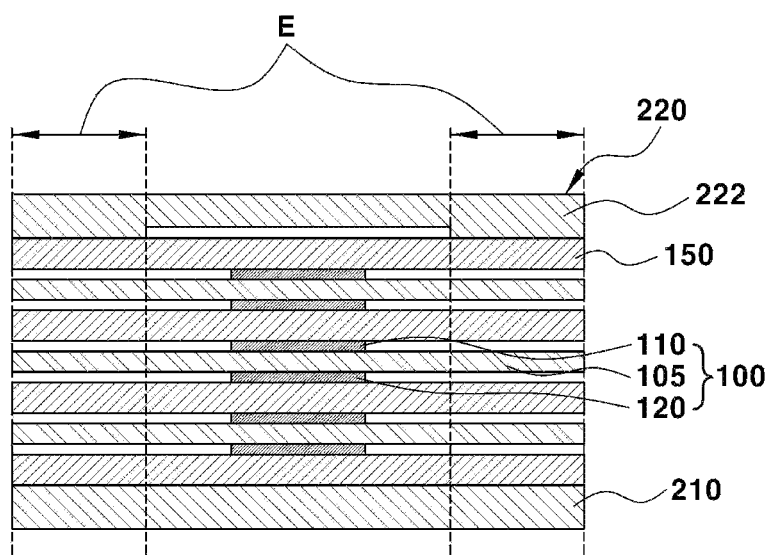
FIG. 7 is a partial cross-sectional view of FIG. 6, taken along line C-C.

FIG. 7 is a partial cross-sectional view of FIG. 6, taken along line C-C. For convenience of description, a description of differences from the above description referring to FIGS. 1 to 6 will be focused upon.

Referring to FIG. 7, in the heat treatment apparatus 200 in accordance with one embodiment of the present disclosure, a plurality of the membrane electrode assemblies 100 may be stacked, rolled into a roll and disposed between the first member 210 and the second members 220. Interleaving sheets 150 may be formed between the membrane electrode assemblies 100. That is, the heat treatment method may further include forming the interleaving sheets 150 between the membrane electrode assemblies 100, prior to disposition of the membrane electrode assemblies 100 between the first member 210 and the second members 220. Formation of the interleaving sheets 150 may increase thermal conductivity of the membrane electrode assemblies 100 disposed between the first member 210 and the second members 220. Further, the sub-gaskets 50 (see FIG. 4) are not inserted into the membrane electrode assemblies 100, and thus, the air layers 103 (see FIG. 4) may not be formed. Therefore, heat may be transferred without insulation, and thus, the membrane electrode assemblies 100 may be heat-treated without a temperature difference according to positions. Such an interleaving sheet 150, for example, in the form of a foil, may be interposed between one membrane electrode assembly 100 and another membrane electrode assembly 100.

Further, the interleaving sheet 150 in accordance with one embodiment of the present disclosure may include one or more selected from the group consisting of: aluminum (Al) and copper (Cu). Alternatively, other types of metals can be used to form the interleaving sheet 150. That is, in order to increase thermal conductivity of the membrane electrode assemblies 100, interleaving sheets 150 formed of various metals may be used.

Further, the thickness of the interleaving sheets 150 may be 50 μm to 100 μm. When the thickness of the interleaving sheets 150 is 100 μm or more, the diameter of the membrane electrode assemblies 100 rolled into the roll is increased and thus heat loss may be increased, and temperature deviation according to positions may occur. In contrast, when the thickness of the interleaving sheets 150 is less than 50 μm, if the interleaving sheets 150 are interposed between the membrane electrode assemblies 100, the interleaving sheets 150 are not completely spread and may be folded or meander, thus damaging the membrane electrode assemblies 100.

The heat treatment apparatus 200 and the heat treatment method using the same in accordance with one embodiment of the present disclosure, as exemplarily shown in FIG. 7, are distinguished from conventional heat treatment apparatuses and methods in that the membrane electrode assemblies 100 may exclude sub-gaskets.

In order to prevent contraction and deformation of the membrane electrode assemblies 100 during heat treatment without the use of sub-gaskets, the second members 220 of the heat treatment apparatus 200 in accordance with one embodiment of the present disclosure may include protrusions 222. In particular, both ends of the second members 220 in the first direction D1 may include the protrusions 222 protruding in the radially inward direction.

Since the membrane electrode assemblies 100 rolled into the roll have parts which are subject to thermal contraction (i.e., contraction weak parts B in FIG. 3) due to thickness deviation, as described above, when the membrane electrode assemblies 100 are heat-treated without separate treatment (for example, insertion of sub-gaskets), contraction and damage starting from the contraction weak parts B occur and may thus damage the overall membrane electrode assemblies 100. However, the second member 220 of the heat treatment apparatus 200 in accordance with the present disclosure has a plurality of the protrusions 222 (for example, two protrusions 222 formed at both ends thereof), and a groove may be formed between the protrusions 222. Thereby, the electrodes 110 and 210 of the membrane electrode assemblies 100 may be disposed in a region corresponding to the groove, and regions of the electrolyte membranes 105 not provided with the electrodes 110 and 210 (hereinafter referred to as protrusion effected regions E) may be disposed to correspond to the protrusions 222. Therefore, in spite of pressurization by the second members 220 and heat treatment, the protrusions 222 may prevent the protrusion effected regions E not provided with the electrodes 110 and 120 from contracting or being structurally deformed. Accordingly, the heat treatment apparatus 200 in accordance with the present disclosure may prevent contraction and structural deformation of the membrane electrode assemblies 100.

These protrusions 222 may have, for example, a protruding length of 1 cm to 5 cm in the radially inward direction from the second member 220, without being limited thereto. That is, the protruding length of the protrusions 222 may be varied according to the thickness of the membrane electrode assemblies 100.

As the protrusions 222 press the membrane electrode assemblies 100 during a heat treatment process, some of the membrane electrode assemblies 100 in the protrusion effected regions E may be damaged. However, a dimension margin is set in the protrusion effected regions E, and thus, damaged parts may be removed through partial punching of the protrusion effected regions E after heat treatment. Otherwise, in order to protect and handle the membrane electrode assemblies 100, a sub-gasket film may be adhered to the upper and lower surfaces of the membrane electrode assemblies 100 through roll pressing after heat treatment, thus covering damaged parts.

Figure 8:
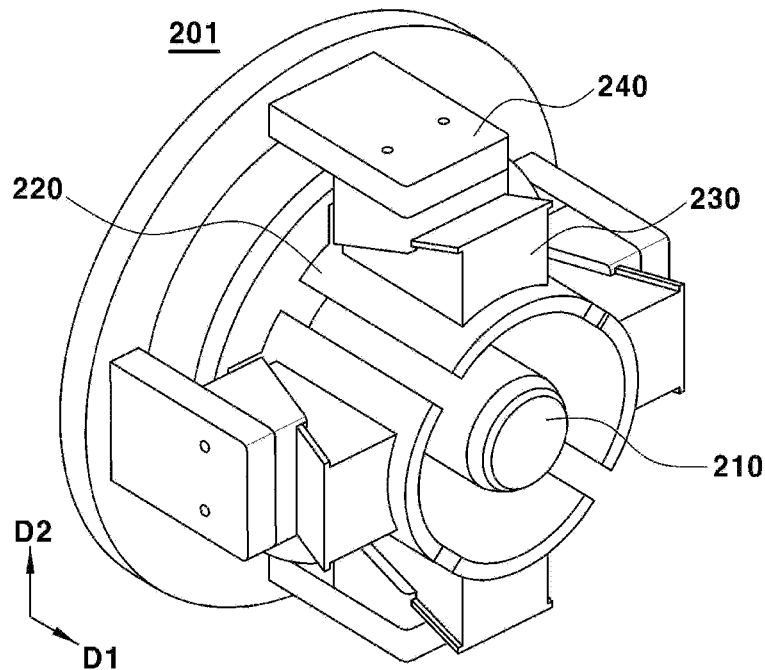
FIG. 8 is a conceptual view illustrating a heat treatment apparatus in accordance with another embodiment of the present disclosure.

FIG. 8 is a conceptual view illustrating a heat treatment apparatus in accordance with another embodiment of the present disclosure. For convenience of description, certain parts in this embodiment which are different from those of the embodiment described using FIGS. 1 to 7 will be described.

Referring to FIG. 8, a heat treatment apparatus 201 in accordance with another embodiment of the present disclosure may further include third members 230 disposed on the outer surfaces of second members 220, and fourth members 240 installed so as to be stretchable from a base 205 (with reference to FIG. 5) and contacting the third members 230. When the fourth members 240 are stretched from the base 205 in the first direction D1, the third members 230 may pressurize the second members 220. Thereby, the second members 220 may be moved in the radially inward direction toward a first member 210. Therefore, after a plurality of membrane electrode assemblies 100 is disposed between the first member 210 and the second members 220, the second members 220 may be moved in the radially inward direction toward the first member 210 and thus pressurize the membrane electrode assemblies 100. After pressurization, a heat treatment process may be performed by conducting heat to the membrane electrode assemblies 100 by heating at least the first member 210 and/or the second members 220.

In the heat treatment apparatus 201 in accordance with another embodiment of the present disclosure, the fourth members 240 may be stretched in the first direction D1 by a driver. Such a driver may be a hydraulic cylinder or a pneumatic cylinder, without being limited thereto.

Figure 9:
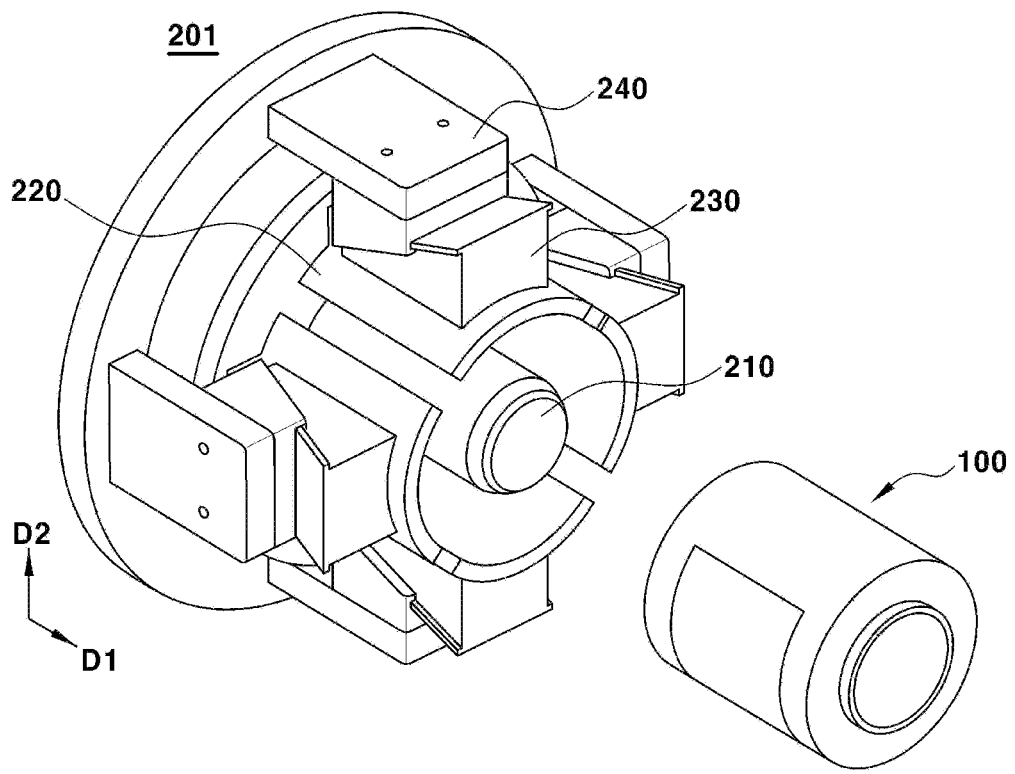
FIGS. 9 to 11 are views illustrating an operating process of the heat treatment apparatus in accordance with another embodiment of the present disclosure.
Figure 10:
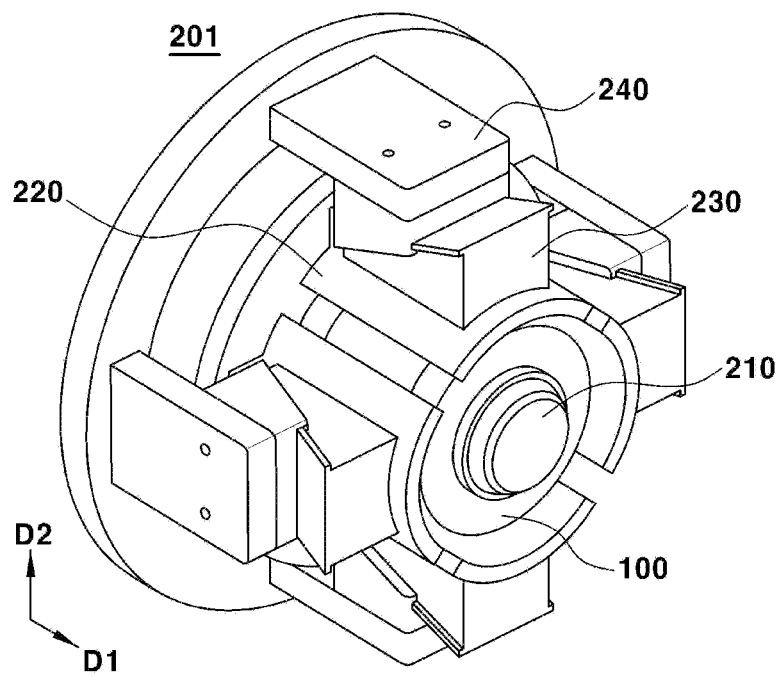
Figure 11:
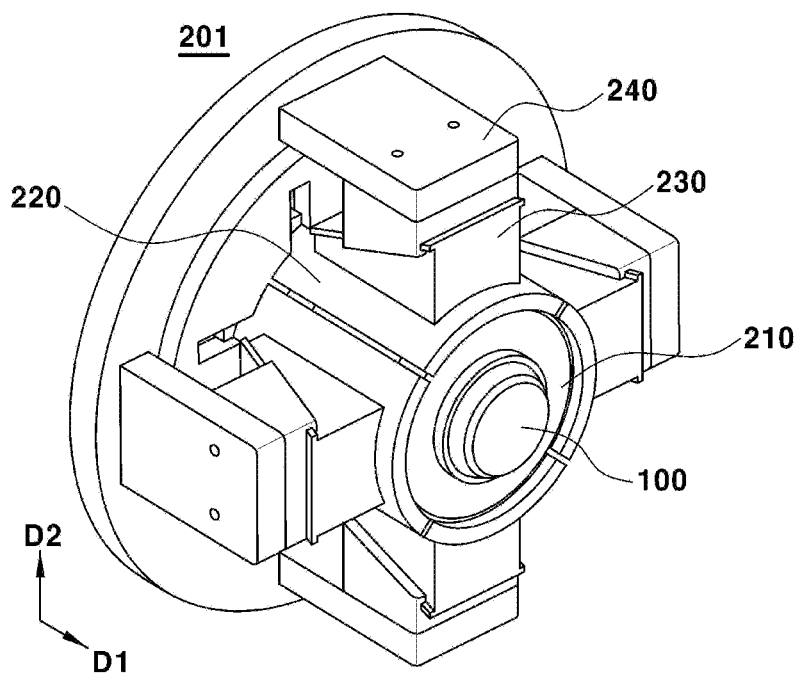

FIGS. 9 to 11 are views illustrating an operating process of the heat treatment apparatus in accordance with another embodiment of the present disclosure. That is, in the heat treatment apparatus 210 in accordance with another embodiment of the present disclosure, a process of moving the second members 220 in the radially inward direction toward the first member 210 by operation of the third members 230 and the fourth members 240 is organically illustrated.

First, referring to FIG. 9, the membrane electrode assemblies 100 rolled into a roll are wound on the first member 210, thus being disposed in the heat treatment apparatus 201. That is, the membrane electrode assemblies 100 are disposed between the first member 210 and the second members 220.

Thereafter, FIG. 10 illustrates the membrane electrode assemblies 100 disposed in the heat treatment apparatus 201. Here, the thickness of the membrane electrode assemblies 100 may be less than a distance between the outer surface of the first member 210 and the inner surfaces of the second members 220. Otherwise, the membrane electrode assemblies 100 may not be sufficiently pressurized in the radially inward direction by the second members 220.

Thereafter, FIG. 11 illustrates movement of the fourth members 240. That is, the fourth members 240 may be stretched in the first direction D1 by the driver. Since the stretched fourth members 240 push the third members 230, the third members 230 may convert force in the first direction D1 into force in the radially inward direction (for example, convert a direction of force by 90°) and thus pressurize the second members 220. That is, since the third members 230 are moved toward the first member 210 in the direction of force, the second members 220 may pressurize the membrane electrode assemblies 100 rolled into the roll. The membrane electrode assemblies 100 rolled into the fixed roll are fixed by pressure applied from the outside or the inside thereof and, thus, deformation of the membrane electrode assemblies 100 during heat treatment may be prevented. Further, the inner layers of the membrane electrode assemblies 100 rolled into the roll are adhered closely and, thus, heat transfer (for example, thermal conduction) efficiency is increased.

Since both ends of the second members 220 in the first direction D1 include protrusions 222 (see FIG. 7) protruding in the radially inward direction, as described above, the membrane electrode assemblies 100 may be fixed. Further, although FIGS. 8 to 11 illustrate the fourth members 240 as being moved in the first direction D1 and the third members 230 as being moved in the radially inward direction, the fourth members 240 and the third members 230 are not limited thereto. That is, in order to pressurize and heat-treat the membrane electrode assemblies 100 disposed between the first member 210 and the second members 220, the third members 230 and the fourth members 240 may be moved in various directions or operated in various manners.

Figure 12:
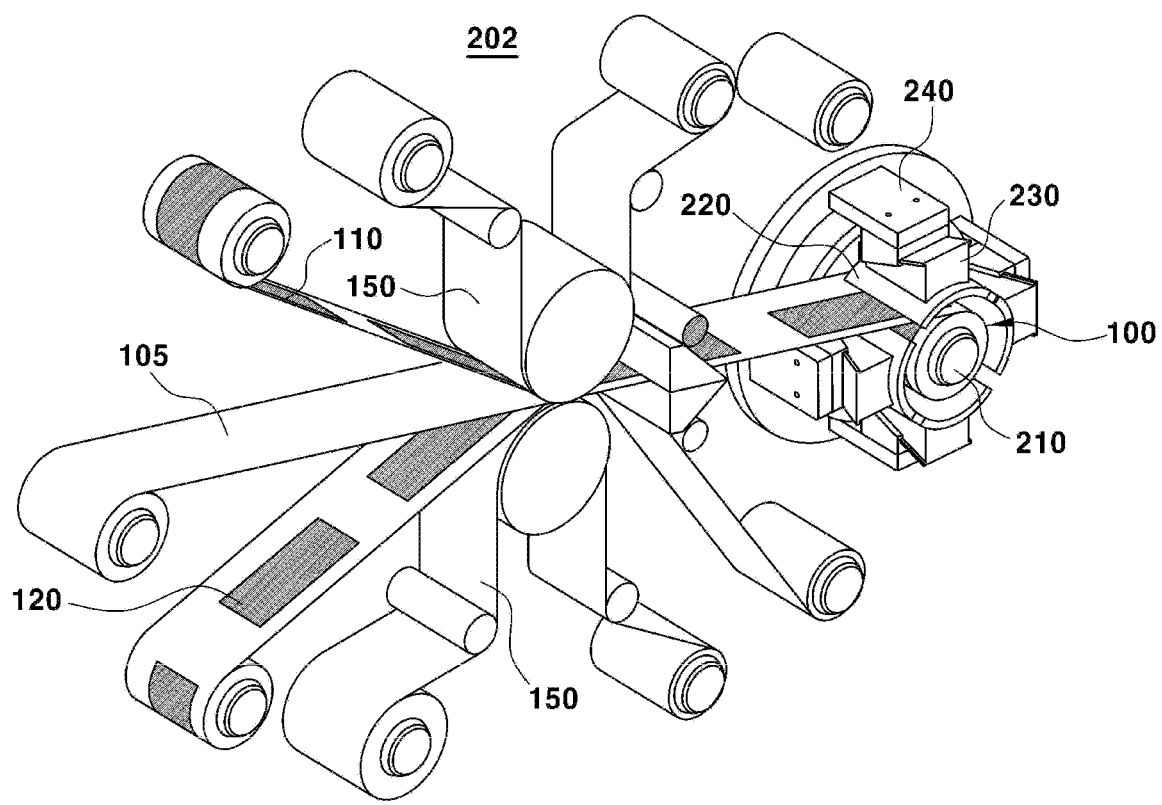
FIG. 12 is a conceptual view illustrating a heat treatment apparatus and an operating process thereof in accordance with yet another embodiment of the present disclosure.

FIG. 12 is a conceptual view illustrating a heat treatment apparatus and an operating process thereof in accordance with yet another embodiment of the present disclosure. For convenience of description, certain parts in this embodiment which are different from those of the embodiments described using FIGS. 1 to 11 will be described.

Referring to FIG. 12, in disposition of a plurality of membrane electrode assemblies 100 (i.e., rolled into a roll) between a first member 210 and second members 220 of a heat treatment apparatus 202 in accordance with yet another embodiment of the present disclosure, in order to stack the membrane electrode assemblies 100 in the radially outward direction from the first member 210, the respective membrane electrode assemblies 100 may be manufactured and then wound on the first member 210, and thus, the membrane electrode assemblies 100 rolled into the roll may be formed.

Further, as exemplarily shown in FIG. 12, before the membrane electrode assemblies 100 are disposed between the first member 210 and the second members 220, the membrane electrode assemblies 100 including a first electrode 110, a second electrode 120 and an electrolyte membrane 105 formed between the first electrode 110 and the second electrode 120 may be formed.

That is, when the heat treatment apparatus 202 is installed at a rewinder for the membrane electrode assemblies 100 so that the membrane electrode assemblies 100 having the three-layer structure are wound on the first member 210, a large number of the membrane electrode assemblies 100 rolled into the roll may be heat-treated immediately after manufacture of the membrane electrode assemblies 100 and thus there is no need to construct separate equipment. That is, process simplification and efficiency may be enhanced by unifying a manufacturing process of the membrane electrode assemblies 100 and a heat treatment process.

Consequently, the heat treatment apparatuses 200, 201 and 202 and the heat treatment methods using the same in accordance with the present disclosure prevent structural deformation of membrane electrode assemblies caused by heat treatment, even through sub-gaskets are not used. Further, since the sub-gaskets are not used, degradation of the membrane electrode assemblies due to degradation of an adhesive, etc. may be prevented and, thus, membrane electrode assemblies having excellent quality (high performance and high durability) may be produced.

Further, membrane electrode assemblies may be mass-produced through heat treatment of the membrane electrode assemblies rolled into a roll and thus a process time may be reduced, and the membrane electrode assemblies may be uniformly heat-treated without a temperature difference according to positions of each membrane electrode assembly and thus structural deformation of the produced membrane electrode assemblies may be prevented and quality of the membrane electrode assemblies may be improved.

As is apparent from the above description, a heat treatment apparatus of membrane electrode assemblies and a heat treatment method using the same according to several embodiments of the present disclosure may prevent structural deformation of the membrane electrode assemblies caused by heat treatment, even through sub-gaskets are not used.

Further, since heat treatment may be performed without use of the sub-gaskets, degradation of the membrane electrode assemblies due to degradation of an adhesive used between the membrane electrode assembly and the sub-gasket may be prevented, and thus, performance and durability of the membrane electrode assemblies may be enhanced.

In addition, the membrane electrode assemblies rolled into a roll may be heat-treated and thus a large number of the membrane electrode assemblies may be heat-treated, and the membrane electrode assemblies may be uniformly heat-treated without a temperature difference according to positions and thus structural deformation of the membrane electrode assemblies may be prevented.

The disclosure has been described in detail with reference to preferred embodiments thereof. However, it will be appreciated by those skilled in the art that changes may be made in these embodiments without departing from the principles and spirit of the disclosure, the scope of which is defined in the appended claims and their equivalents.

What is claimed is:

1. A heat treatment method of membrane electrode assemblies, comprising:
preparing a heat treatment apparatus comprising a first member extending from a base in a first direction and a plurality of second members formed on the base in a radially outward direction of the first member;
disposing membrane electrode assemblies provided in plural between the first member and the plurality of second members of a heat treatment apparatus in which at least the first member or the second members includes a heat wire member;
pressurizing the membrane electrode assemblies by moving the second members in a radially inward direction toward the first member; and
conducting heat to the membrane electrode assemblies by heating at least the first member or the second members, and
wherein the disposing the membrane electrode assemblies between the first member and the second members comprises: winding the membrane electrode assemblies on the first member so as to be stacked on the first member in a radially outward direction.

2. The heat treatment method of claim 1, further comprising forming the membrane electrode assemblies, each membrane electrode assembly comprising a first electrode, a second electrode and an electrolyte membrane formed between the first electrode and the second electrode, prior to disposing the membrane electrode assemblies between the first member and the second members.

3. The heat treatment method of claim 1, further comprising forming interleaving sheets between the membrane electrode assemblies, prior to disposing the membrane electrode assemblies between the first member and the second members.

4. The heat treatment method of claim 1, wherein, in pressurizing the membrane electrode assemblies, the second members are moved in the radially inward direction toward the first member to pressurize the membrane electrode assemblies with a load of 500 kgf to 1000 kgf.

5. The heat treatment method of claim 1, wherein, in pressurizing the membrane electrode assemblies:
when a pressurized load applied to the membrane electrode assemblies is less than 500 kgf, the second members are moved in the radially inward direction toward the first member; and
when the pressurized load applied to the membrane electrode assemblies exceeds 1000 kgf, the second members are moved in a radially outward direction.

6. The heat treatment method of claim 1, wherein, in conducting heat to the membrane electrode assemblies, the heat is conducted to the membrane electrode assemblies by heating at least the first member or the second members to a temperature range of 100° C. to 200° C.

* * * * *